United States Patent [19]

Resch

[11] Patent Number: 5,558,413
[45] Date of Patent: Sep. 24, 1996

[54] BRAKE-PRESSURE CONTROL DEVICE HAVING REAR-AXLE BRAKE CIRCUIT SELF-PRIMING RECIRCULATION PUMP

[75] Inventor: Reinhard Resch, Stuttgart, Germany

[73] Assignee: Mercedes-Benz AG, Germany

[21] Appl. No.: 434,800

[22] Filed: May 4, 1995

[30] Foreign Application Priority Data

May 4, 1994 [DE] Germany ............... 44 15 651.0

[51] Int. Cl.⁶ .................................................. B60T 8/32
[52] U.S. Cl. ........................... 303/115.3; 303/113.2
[58] Field of Search .................. 303/114.1, 114.3, 303/114.2, 113.2, 116.1, 116.2, 115.1, 115.3, 115.4

[56] References Cited

U.S. PATENT DOCUMENTS

| | | | |
|---|---|---|---|
| 3,837,711 | 9/1974 | Van House et al. | 303/115.3 |
| 4,066,301 | 1/1978 | Harries | 303/115.3 |
| 4,861,118 | 8/1989 | Burckhardt et al. | 303/113.2 |
| 5,401,083 | 3/1995 | Altmann et al. | 303/113.2 |
| 5,403,076 | 4/1995 | Altmann et al. | 303/113.2 |

FOREIGN PATENT DOCUMENTS

4329139C1  7/1995  Germany .

PCT/DE93/ 00802  4/1994  WIPO .

Primary Examiner—Matthew C. Graham
Attorney, Agent, or Firm—Evenson, McKeown, Edwards & Lenahan, P.L.L.C.

[57] ABSTRACT

In a brake-pressure control device for a road vehicle having a hydraulic two-circuit brake system with front-axle/rear-axle brake circuit distribution, an anti-lock brake system (ABS) operates according to the recirculation principle and a device for dynamic movement control (FDR) requires the wheel brakes to be individually capable of automatic activation. The recirculation pumps of the ABS are utilized as pressure sources. The recirculation pump of the rear-axle brake circuit is constructed as a self-priming pump while the recirculation pump of the front-axle brake circuit is constructed as a non-self priming pump. The minimum pressure which is required for the input supply of the non-self priming pump is produced by a precharging cylinder which is connected between the main cylinder of the brake system and the ABS hydraulic unit. This precharging cylinder has a hydraulic or pneumatic drive cylinder for whose pressure supply a built-in hydraulic or pneumatic pressure source, e.g. the permanently driven supply pump of a ride leveller or the pressure supply pump of a pneumatic suspension, is used.

18 Claims, 3 Drawing Sheets

BRAKE-PRESSURE CONTROL DEVICE HAVING REAR-AXLE BRAKE CIRCUIT SELF-PRIMING RECIRCULATION PUMP

CROSS REFERENCE TO RELATED APPLICATION

This application is related to an application entitled VEHICLE HYDRAULIC DUAL-CIRCUIT BRAKE SYSTEM filed in the name of Reinhard RESCH, on even date herewith, under Ser. No. 08/434,805. The subject matter of that application, including the background discussion, is incorporated herein by reference.

BACKGROUND AND SUMMARY OF THE INVENTION

The present invention relates to a brake-pressure control device for a road vehicle having a hydraulic two-circuit brake system in which, the device is equipped with an anti-lock brake system (ABS) which operates according to the recirculation principle and with a device for dynamic movement control (FDR).

A brake-pressure control device is the subject of a non-prepublished patent application P 43 29 139.2 and was conceived for a road vehicle with front axle/rear axle brake circuit distribution. A static main cylinder constructed as a tandem main cylinder was provided as a brake-pressure control device with pressure outputs individually assigned to the brake circuits. The dynamic movement control device operated according to the principle of keeping the longitudinal slip and the lateral slip of the vehicle wheels within limits which are compatible overall with dynamic stability of the vehicle by electronically controlled, automatic activation of one or more wheel brakes.

The recirculation pump or pumps of the known anti-lock brake system is or are utilized as pressure sources, from which the wheel brakes utilized for the control can be supplied with brake pressure in dynamic movement control mode and can be supplied on the input side with the output pressure of a precharging pump which operates at a relatively low output pressure level of, for example, 15 bar and is electrically driven.

In order to separate the two brake circuits hydraulically, each circuit is provided with individually assigned precharging cylinders which have one piston each which separates an output pressure space in a pressure-tight way from a drive pressure space to which the pressure output of the precharging pump is connected. The output pressure space can be connected, via an electrically actuable precharging control valve, to the low pressure port of the recirculation pump of the respective brake circuit. Two flanges are arranged at an axial distance from one another and between which extends an overrun space which is kept in constant communication with, in each case, one of the pressure outlets of the brake device.

The piston of the respective precharging cylinder is provided with a valve which can be activated mechanically and also fulfills the function of a non-return valve which blocks a through-flow channel of the piston which connects the overrun space to the output pressure space, for as long as the pressure in the output pressure space of the respective precharging cylinder is greater than in the overrun space and clears this through-flow path when the main cylinder output pressure applied to the overrun space is greater than the pressure in the output pressure space of the precharging cylinder.

Between the pressure output of the respective precharging cylinder and the main brake line of the brake circuit which is supplied with pressure, in each case an electrically actuable change-over valve is connected to be open when deactivated and to block in the excited state which is assigned to dynamic movement control mode. The low-pressure inputs of the two recirculation pumps are connected to the main brake line of the respective brake circuit via in each case one non-return valve which is acted on in the opening direction by relatively higher pressure in the return line of the respective brake circuit than at the low-pressure inlet of its recirculation pump, and is otherwise blocked. The two precharging cylinders have a common drive pressure space which is connected to the pressure output of the precharging pump and can be blocked off from the brake-fluid reservoir container of the brake system by actuating a solenoid valve which is open when deactivated.

The considerable technical outlay and spatial requirements associated with the two precharging cylinders and increased by the need for a precharging pump, must be seen as disadvantages of the brake-pressure control device according to the above-mentioned patent application P 43 29 139.2. The brake-pressure control device is of substantially more complicated configuration, and also correspondingly more expensive, compared to a vehicle which is equipped with an anti-lock brake system and a traction control system which permits only the wheel brakes of the driven vehicle wheels to be activated automatically. In addition, in a brake system equipped with the brake-pressure control device explained here, additional chambers are also present because of the additional precharging cylinders, and gas bubbles which can form when the wheel brakes are subjected to high thermal stresses can only escape with difficulty from the chambers. This is particularly so if the two precharging cylinders are combined to form a "symmetrical" constructional unit. Therefore, the arrangement of the two precharging cylinders which is most favorable for them to be vented at all satisfactorily can, at most, be the best possible compromise.

An object of the present invention is, therefore, to improve a brake-pressure control device to such an extent that it is possible to achieve increased functional reliability of the control device with an apparatus which is still simpler and more cost effective.

This object has been achieved according to the present invention by a brake pressure control device in which the recirculation pump of the rear-axle brake circuit is configured as a self-priming pump. Moreover, the precharging cylinder is configured to be activatable in order to increase pressure in the output pressure space by one of (i) valve-controlled application to a drive pressure space of the precharging cylinder of output pressure of a built-in vehicle hydraulic pressure source vehicle, wherein the output pressure from one of a hydraulic power steering system and a permanently driven hydraulic ride leveller pump and (ii) valve-controlled venting of a drive chamber constituting the drive pressure space previously connected to a built-in vacuum source of a pneumatic driving cylinder and output pressure of a built-in, pneumatic pressure source to the pneumatic cylinder.

Accordingly, instead of a non-self priming recirculation pump, usually an eccentric-operated free-piston pump, a self-priming recirculation pump is provided for the rear-axle brake circuit. The self-priming recirculation pump can be a piston pump whose piston is continuously forced by a restoring spring into a position which corresponds to the maximum volume of the pump chamber so that the pump chamber into which brake fluid can continuously flow on, via an input non-return valve which has an opening pressure which is significantly lower than 1 bar, e.g. only 0.2 bar, is reduced in volume when the piston is displaced by the compression stroke and brake fluid can be forced, via the output non-return valve of the pump, into the connected main brake line of the rear-axle brake circuit II.

By virtue of this recirculation pump, automatically controlled braking phases can be ensured at the rear wheel brakes solely by actuating the recirculation pump. The rear-axle brake circuit is shut off from the rear-axle pressure output of the brake device by its change-over valve, but the rear-axle pressure output in return is connected to the low-pressure input of the recirculation pump via a supply control valve.

A precharging cylinder is provided for the front-axle brake circuit which is hydraulically separated from the rear-axle brake circuit II. The precharging cylinder can be activated in order to increase pressure in its output pressure space in the event of an automatically controlled activation of one or more front-wheel brakes in order to feed brake fluid into the pump chamber of an associated recirculation, non-self priming pump by valve-controlled application to a drive pressure space of the precharging cylinder with the output pressure of a built-in hydraulic pressure source of the vehicle, e.g. the output pressure for supplying pressure to a hydraulic power steering system or the output pressure of a permanently driven pump of a hydraulic ride leveller. Alternatively, this can also take place by valve-controlled venting of a drive chamber already connected to a built-in vacuum source, e.g. the vehicle engine suction connector, of a pneumatic cylinder or by applying to the same the output pressure of a built-in pneumatic pressure source such as the pressure supply unit of a pneumatic suspension.

As a result of supplying drive pressure to the precharging cylinder which is provided for supplying brake fluid to the recirculation pump of the front-axle brake circuit I by valve-controlled connection of its drive cylinder, which can be of simple configuration, to a pressure source or vacuum source, which is already present in the vehicle, the precharging pump which is otherwise necessary is omitted and is, so to speak, replaced by a pressure source or vacuum source which is already present on the vehicle. Compared with the brake-pressure control device according to the aforementioned patent application p 43 29 139.2, the obstacle for realizing an otherwise functionally equivalent brake-pressure control device is reduced by a precharging cylinder which is assigned to the rear-axle brake circuit II and the precharging pump which is necessary in the aforesaid brake-pressure control device. The saving in terms of technical outlay and spatial requirements thereby achieved can be considered a considerable technical advantage. Moreover, the arrangement of the precharging cylinder for the front-axle brake circuit I can be achieved without compromise in order to obtain better venting.

Of course, by configuring the recirculation pump of the front-axle brake circuit I as a self-priming pump, according to the present invention for the rear-axle brake circuit II, an overall, even more far-reaching, simplification of the brake-pressure control device is achieved. That is, with a corresponding configuration of the recirculation pump of the front-axle brake circuit I, the precharging cylinder which is provided for the said brake circuit I can be eliminated and a built-in pressure source or vacuum source provides the operational capability. Such a "consistent" simplification of the brake-pressure control device to the largest possible degree in comparison with that described in the aforementioned patent application P 43 29 139.2 is, however, hindered by the fact that the functional reliability of such a self-priming recirculation pump is somewhat less than that of one which can be operated with, so to speak, forced feeding of the pressure medium so that it appears expedient to operate the pressure source for the front-wheel brakes, i.e. the recirculation pump of the front-axle brake circuit I, with precharging pressure in the automatically controlled braking mode. This applies in particular to a situation in which the ambient temperature is very low and therefore the viscosity of the brake fluid can be high.

The configuration which is preferably selected for the auxiliary cylinder according to the present invention and its drive cylinder has the advantage that there is an annular space which can be utilized as a media separation space, and can be expediently vented, i.e. is kept below the pressure of the ambient atmosphere, can, if appropriate, also be connected to the suction connector of the vehicle engine. The media separation space can be connected to the brake fluid reservoir container in the event that the drive cylinder of the auxiliary cylinder is constructed as a pneumatic cylinder.

As a result of the auxiliary cylinder/drive cylinder assembly according to the features of the present invention, reliable separation of media is achieved in the event that the drive cylinder is operated with a hydraulic oil. For example a mineral oil is customarily used and must not be mixed with brake fluid if damage to the piston seals of the auxiliary cylinder piston and/or of the drive piston is to be reliably avoided.

If the piston of the drive cylinder has a cross-section which is different from the piston of the auxiliary cylinder, these pistons are advantageously constructed as separate components in order to be able to compensate easily for production tolerances, such as small eccentricities in the bore hole stepping of a common cylinder housing.

If the supply pressure which is required for activating the precharging pressure source, for its drive cylinders, is derived, according to the features of the present invention, from the output pressure of a permanently driven hydraulic pump and can be adjusted according to the principles disclosed herein, the brake-pressure control device itself can be very easily adapted to a pressure supply unit which is present on the vehicle.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
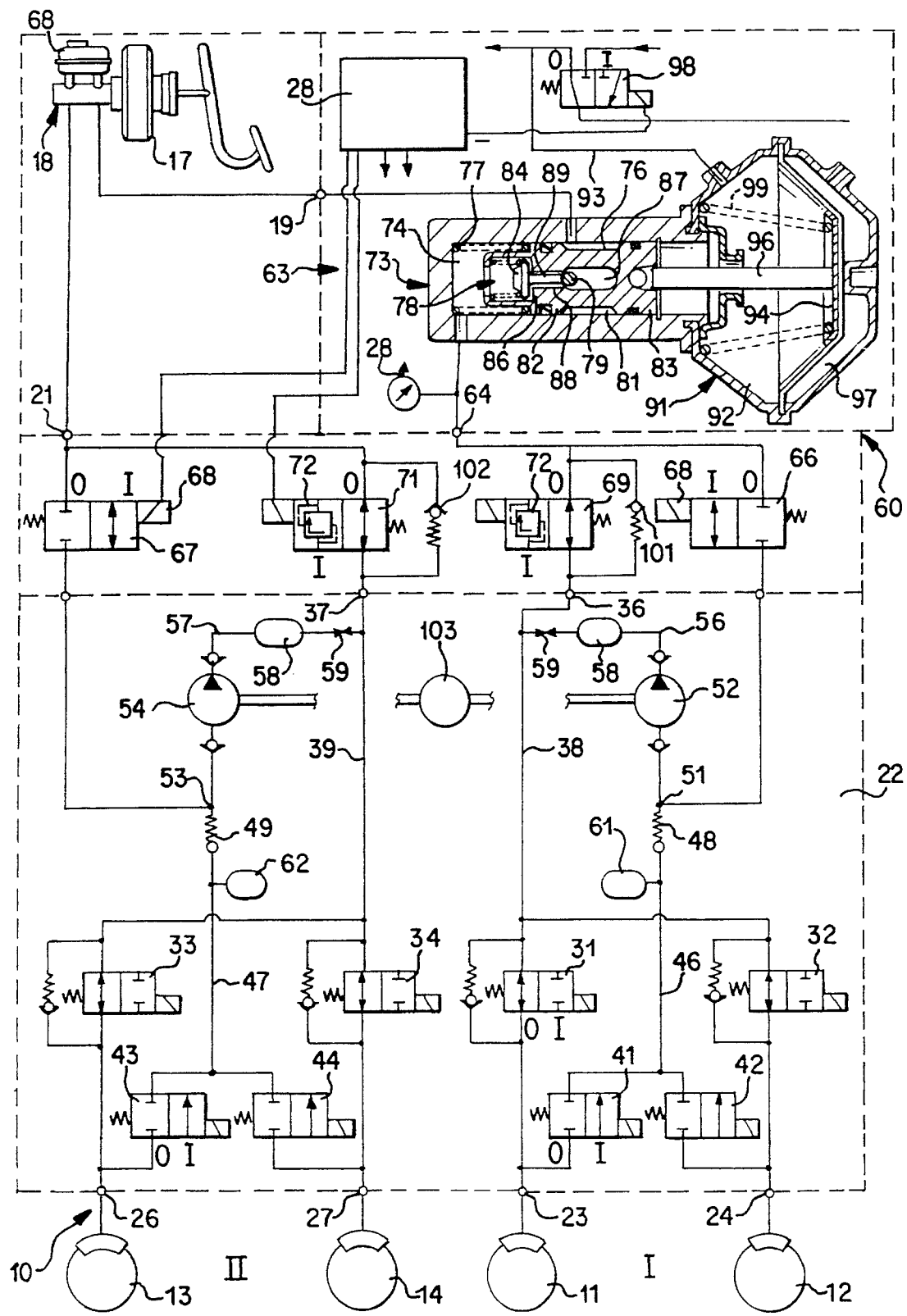
FIG. 1 is an electrohydraulic schematic diagram of a two-circuit brake system of a road vehicle with a brake-pressure control device according to the present invention for a dynamic movement control and traction control.

The hydraulic two-circuit brake system designated generally by numeral 10 in FIG. 1 represents a road vehicle equipped with an anti-lock brake system (ABS) which operates according to the recirculation principle and a device for dynamic movement control (FDR) which is intended to keep the longitudinal slip and the lateral slip of the vehicle wheels within values which are compatible overall with the dynamic stability of the vehicle by an automatically controlled increase in brake pressure and/or decrease in brake pressure at one or more of the wheel brakes 11 to 14.

The brake system 10 has front-axle/rear-axle brake circuit distribution. The two brake circuits I and II are constructed as closed, static, brake circuits whose brake pressure supply is controlled during "normal" braking. That is, normal braking is that braking in which the generation of brake pressure is controlled by the driver by activating a brake pedal 16 takes place by a tandem main cylinder 18, of conventional design. The cylinder 18 is activated via a pneumatic brake booster 17 and has a primary pressure output 19 which is assigned to the front-axle brake circuit I and a secondary pressure output 21 which is assigned to the rear-axle brake circuit II. Static pressures ($P_{VA}$) and ($P_{HA}$) are provided at the pressure outputs 19, 21 when the main cylinder 18 is activated.

Figure 2:
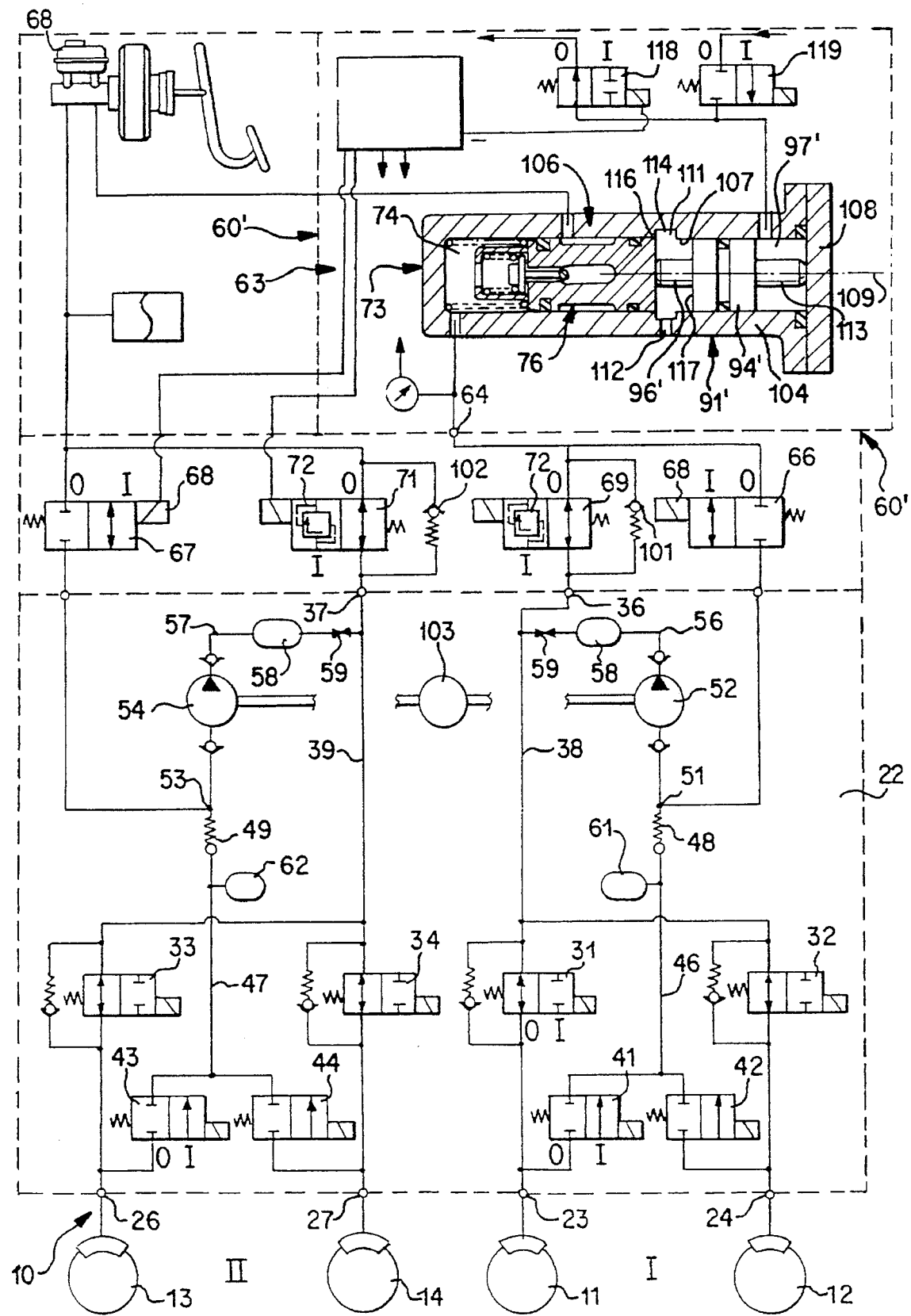
FIG. 2 is a schematic diagram of a second embodiment of a functionally corresponding brake-pressure control device which can be used in the brake system according to FIG. 1.

The ABS which is conventionally constructed as a 4-channel system is represented in FIGS. 1 and 2 only by its hydraulic unit which is designated generally by numeral 22 and to whose pressure outputs 23, 24 and 26, 27 the wheel brake lines which lead to the wheel brakes 11 to 14 are connected. Wheel speed sensors which are individually assigned to the vehicle wheels and which produce electrical output signals which are characteristic for the dynamic behavior of the vehicle wheels and are fed as information signals to an electronic control unit 28 which controls the various control functions are not illustrated for the sake of simplicity.

The hydraulic unit 22 comprises inlet valves 31 to 34 which are individually assigned to each of the respective wheel brakes 11 to 14. The inlet valves are constructed as 2/2-way solenoid valves with a basic position 0 which is open when deactivated and a blocking switched position I. In their basic position 0, the front wheel brakes 11, 12 and the rear wheel brakes 13, 14 are connected to, in each case, one main brake line channel 38 or 39 of the ABS hydraulic unit 22. The main brake line channel 38 or 39 starts from a brake pressure supply port 36 or 37 of the ABS hydraulic unit 22 and is assigned to the front-axle brake circuit I or the rear-axle brake circuit II.

The hydraulic unit 22 also comprises outlet valves 41 to 44 which are individually assigned to the wheel brakes 11 to 14 and are also constructed as 2/2-way solenoid valves but with a blocking basic position 0 and an open switched position I. Switching over of the outlet valves into the through-flow position I permits the front wheel brakes 11, 12 or the rear wheel brakes 13, 14 to be connected, in each case, individually or together to a return line 46 of the front-axle brake circuit I or a return line 47 of the rear-axle brake circuit II. Thereby, for example, brake pressure reduction phases of the anti-lock control can be controlled.

The return lines 46, 47 are connected via, in each case, one non-return valve 48, 49 to the low pressure input 51 of the recirculation pump 52 of the front-axle brake circuit I and of the low pressure input 53 of the recirculation pump 54 of the rear-axle brake circuit II. The non-return valves 48, 49 are each acted on in the opening direction by relatively higher pressure in the return line 46 and the return line 47 than at the low pressure input 51 or 53 of the respective recirculation pump 52 or 54. Otherwise, the non-return valves 48, 49 are in a blocking state.

The respective high pressure outputs 56, 57 of the recirculation pumps 52, 54 are each connected to the main brake line channel 38 or 39 of the front-axle brake circuit I or of the rear-axle brake circuit II via one buffer chamber 58 and a damper throttle 59 which is hydraulically connected downstream of the buffer chamber 58. In each case, one low pressure accumulator 61 or 62 is connected to the respective return lines 46, 47 of the front-axle brake circuit I and of the rear-axle brake circuit II. The capacity of the low pressure accumulators 61, 62 corresponds to between ⅕ and ½ of the maximum amount of brake fluid which can be forced into the wheel brakes of the respective brake circuit. Thereby, a rapid reduction of pressure in a pressure reduction phase of the anti-lock control is possible via the outlet valves 41, 42 or 43, 44 before the discharged brake fluid can be recirculated again into the main brake line channel 38, 39 and from there to the tandem main cylinder 18 by way of the respective recirculation pump 52, 54.

The hydraulic unit 22, explained so far, of the anti-lock brake system forms a subunit of a brake-pressure control device which is designated generally by numeral 60 and in the dynamic movement control mode carries out the control of the relevant control phases which can proceed as automatically triggered activation of one or more wheel brake, or else as brake-pressure change phases, superimposed on braking controlled by the driver, at individual wheel brakes.

In order, at the same time, to be able to utilize the recirculation pumps 52, 54 of the ABS hydraulic unit 22 as brake pressure sources which in this case cannot be supplied with brake fluid from the low pressure accumulators 61, 62, a separate precharging pressure source designated generally by numeral 63 is provided for the recirculation pump 52 of the front-axle brake circuit I. The recirculation pump 52 is assumed to be the pump and requires a brake fluid supply at a minimum pressure level. The output pressure port 64 of the precharging pressure source 63 is connected, via a precharging control valve 66, to the low pressure port 51 of the recirculation pump 52 of the front-axle brake circuit I. Thereby, in dynamic movement control mode, the recirculation pump 52 is supplied with brake fluid at the required minimum pressure level.

Furthermore, a supply control valve 67 is provided for connecting the secondary pressure output 21 of the tandem main cylinder 18 of the brake system 10 to the low pressure port 53 of the recirculation pump 54 of the rear-axle brake circuit II. Thereby, the feed pump 54, which is constructed as a self-priming pump can prime or take up brake fluid via the reservoir container by the main cylinder 18 in a control phase of the dynamic movement control mode. In this control phase, the main cylinder 18 is not actuated, and the feed pump 54 is supplied with pressurized brake fluid in a dynamic movement control mode in which the brake system 10 is actuated by the driver.

The precharging control valve 66 which is assigned to the front-axle brake circuit I and the supply control valve 67 which is assigned to the rear-axle brake circuit II are each constructed as 2/2-way solenoid valves which can be actuated by output signals of the electronic control unit 28. The basic position 0 of valves 66, 67 is in the deactivated state of their control magnets 68, their blocking position, and their position I which is the actuated state of their control magnet 68 is their through-flow position.

In order to prevent brake fluid which is pumped by way of the recirculation pumps 52, 54 into the main brake line sections 38, 39 of the ABS hydraulic unit 22 from being able to flow off to the main cylinder 18 in dynamic movement control mode, change-over valves 69, 71 which are respectively individually assigned to the front-axle brake circuit I and the rear-axle brake circuit II are provided. The change-over valves 69, 71 have as their basic position 0 assigned to normal braking mode a through-flow position in which the brake pressure ($P_{VA}$), ($P_{HA}$) which is provided by activating the main cylinder 18 at its pressure outputs 19, 21 is present at the brake pressure supply ports 36, 37 of the ABS hydraulic unit 22, and in whose switched position I, which is assigned to the dynamic movement control mode, the brake pressure supply ports 36, 37 of the ABS hydraulic unit 22 are shut off from the brake-fluid flow paths which can be routed via the change-over valves 69, 71. The change-over valves 69, 71 have, however, in this blocking position the function of pressure limiting valves 72 which are integrated into the change-over valves 69, 71 and are configured with a limitation level of about 180 bar.

In the embodiment of FIG. 1, the change-over valves 69, 71 are also constructed as solenoid valves which can be actuated by output signals of an electronic control device 28. The change-over valve assigned to the rear-axle brake circuit II is connected hydraulically between the pressure supply port 37 of the ABS hydraulic unit 22 and the secondary pressure output 21 of the tandem main cylinder 18, and the change-over valve 69 assigned to the front-axle brake circuit I is connected between the brake-pressure supply port 36 of the ABS hydraulic unit 22 and the output pressure port of the precharging pressure source 63 which is constructed in such a way that during normal braking, the output pressure which is provided at the primary pressure output 19 of the tandem main cylinder 18 is present at this output pressure port 64.

The precharging pressure source 63 comprises an auxiliary cylinder, designated generally by numeral 73, is constructed as a single-circuit main cylinder and has an output pressure space 74 which is in continuous communication with the output pressure port 64 of the precharging pressure source 63. Static pressure can be built up in the output pressure space 74 by displacing the cylinder piston which is designated generally by numeral 76.

The piston 76 of the auxiliary cylinder 73 is forced by a restoring spring 77, which is arranged inside the output pressure space 74, into a basic position which is marked by a stop effect and corresponds to the maximum volume of the output pressure space 74. In this basic position, a central valve designated generally by numeral 78 is integrated into the piston 76 and is held in an open position by the stop effect of its valve element with a stop pin 79 which is fixed to the housing. In this open position, the output pressure space 74 of the auxiliary cylinder 73 communicates with an overrun space 81 of the main cylinder 73. The overrun space 81 is itself connected to the primary pressure output 19 of the tandem main cylinder 18 and therefore to the primary output pressure space of the tandem main cylinder 18 and, as long as the tandem main cylinder is not activated, is kept in continuous communication with the brake fluid reservoir container 68.

The overrun space 81 is bounded axially by two flanges 82, 83 which are arranged at an axial distance from one another, are each sealed off from the cylinder hole by one annular seal and are connected to one another by a piston rod with a smaller diameter. The piston rod has a slit which extends in the axial direction and through which the stop pin 79 which is fixed to the housing passes radially. The central valve 78 is a plate seat valve whose valve body 84 is forced by a valve spring in the direction of the valve seat 86 which surrounds the mouth aperture of a central through-flow channel 88 which opens into the longitudinal slot 87 and, via this, into the overrun space 81. The valve body 84 is provided with a plunger-like projection 89 which passes through the through-flow channel 88 and has a smaller diameter and which, by being axially supported on the stop pin 79, permits the valve body 84 to be lifted off from its valve seat 86 in the illustrated basic position of the piston.

A pneumatic drive cylinder which is designated generally by numeral 91 is provided to activate the auxiliary cylinder 73. The pneumatic drive cylinder 91 has, in a way which is largely analogous in constructional terms to a vacuum brake booster, a vacuum chamber 92 which is permanently connected to the air inlet connector of the vehicle engine (not illustrated) via a vacuum connecting line 93 and, by way of a piston 94 which engages axially on the auxiliary cylinder piston 76 via a piston rod 96, is movably separated off from a drive chamber 97 in a pressure-tight fashion. The drive chamber 97 can also be connected to the vacuum line 93 by an electrically actuable activation control valve 98, and alternatively can either be supplied with the atmospheric ambient pressure or with a higher pressure which can be supplied by a pneumatic pressure source (not illustrated), e.g. the compressed air source of a pneumatic vehicle suspension.

The activation control valve 98 is a 3/2-way solenoid valve which can be actuated by the output signals of the electronic control unit 28. In the basic position of the activation control valve 98, the drive chamber 97 is connected to the vacuum connection line 93 and is shut off from the ambient atmosphere so that the piston 94 can be forced by a restoring spring 99 (dash lines) of the pneumatic drive cylinder 91 and/or the restoring spring 77 (dash lines) into its illustrated basic position which corresponds to the minimum volume of the drive chamber 97 and in which the auxiliary cylinder piston 76 also assumes its basic position.

In the excited position I of the actuation control valve 98, the drive chamber 97 is shut off from the vacuum connection line 93 and is subjected instead to the pressure of the ambient atmosphere or to the output pressure of a pneumatic pressure source so that a force which brings about the increase in pressure in the output pressure space 74 is exerted on the auxiliary cylinder piston 76. The central valve has already moved into its closed position after a small initial section of the piston stroke.

In the closed state, the central valve 78 carries out the function of a non-return valve which is acted on in the opening direction by a relatively higher pressure at the primary pressure output 19 of the tandem main cylinder than in the output pressure space 74 of the auxiliary cylinder 73. Thereby, during a dynamic movement control process, a higher pressure can be built up in the output pressure space 74 of the auxiliary cylinder by activating the tandem main cylinder 18. This higher pressure can be applied, even if the change-over valve 69 of the front-axle brake circuit I is kept closed, to the main brake line 18 of the front-axle brake circuit I via a non-return valve 101 which is connected parallel to the change-over valve 69 and is acted on in the opening direction by this high pressure. A functionally corresponding non-return valve 102 is also connected parallel to the changeover valve 71 of the rear-axle brake circuit II.

The above-described brake circuit 10 operates during normal braking, which is controlled by the driver and not subjected to the aforesaid control methods, like a customary two-circuit brake system which is equipped with an ABS operating according to the recirculation principle. In this case, the only basic difference with respect to such a brake system is that the brake pressure ($P_V$) which can be applied to the front-axle brake circuit I is applied to the main brake line channel 38 of the hydraulic unit 22 of the anti-lock brake system or the front-axle brake circuit I via the overrun space 81 of the auxiliary cylinder 73, the central valve 78 which is open in the basic position of the auxiliary cylinder piston 76, the output pressure space 74 of the auxiliary cylinder and the change-over valve 69 which is connected downstream thereof. Moreover, the brake pressure ($P_{HA}$) is applied to the main brake line channel 38 on the rear-axle brake circuit II via the change-over valve 71, which is open in its basic position, of the rear-axle brake circuit II.

To explain the dynamic movement control mode, it is initially assumed that brake pressure is to be increased at a single wheel brake, e.g. the left front-wheel brake 11. In this demand situation, the change-over valve 72 of the front-axle brake circuit I is switched over into its blocking or pressure-limiting function position I, and the precharging control valve 66 is switched over into its through-flow position I. At the same time as the switching over of these two valves 72, 66 (or slightly delayed with respect thereto), the activation control valve 98 of the admission pressure source 63 is switched over into its function position I in which the drive chamber 97 of the pneumatic drive cylinder 91 is subjected to the atmospheric ambient pressure. As a result, the auxiliary cylinder 73 is activated with the effect of increasing pressure in its output pressure space 74 so that brake fluid is fed to the low pressure input 51 of the non-self priming recirculation pump 52 of the front-axle brake circuit I whose drive 103, which is also used to drive the recirculation pump 54 of the rear-axle brake circuit II, is switched on when the activation control valve 98 is switched on.

Since the objective here is only to brake the left-hand front wheel, the inlet valves 32 of the right-hand front wheel brake 12 and the inlet valves 33, 34 of the respective rear wheel brakes 13, 14 are switched into their blocking positions. The increase in brake pressure in the left front wheel brake 11 can be controlled by pulsed switching over of its inlet valve 31 between its basic position 0 and its blocking position I. The metering of pressure is controlled as a function of the generation of the brake slip occurring at the left-hand front wheel. The brake slip is detected, for example, from an evaluation of the output signals of the wheel speed sensors by the electronic control unit 28.

The further reduction of a brake pressure which has been applied once can be controlled so that the recirculation pump 52 is switched off and the change-over valve 72, the precharging control valve 66 and the actuation control valve 98 are switched back again into their basic position so that brake fluid can flow out of the front wheel brake 11 back into the output pressure space 74 of the auxiliary cylinder 73 via the opened change-over valve 72.

A further reduction in the pressure is also possible by virtue of the fact that, while the change-over valve 69 is moved into its functioning position I, the precharging control valve 66 remains in its blocking basic position 0 and the recirculation pump 52 is in operation. The outlet valve 41 of the wheel brake 11 which is to be relieved is switched into its open position I so that brake fluid is initially taken up by the low pressure accumulator 61 and subsequently pumped back by the recirculation pump 52 into the auxiliary cylinder 73, via the change-over valve 69, 72 which is operated in its pressure-limiting function.

If, as illustrated, the two recirculation pumps 52, 54 have a common drive 103, it is advantageous, in order to avoid an increase in pressure in the main brake line 39 of the rear-axle brake circuit II in the above-described example of system operation if the supply control valve 67 which is connected between the low pressure input 53 of the recirculation pump 54 of the rear-axle brake circuit II and the pressure output 21, assigned thereto, of the main cylinder 18 is kept in its blocking position 0 so that the pump is not supplied with any brake fluid which it could feed. The change-over valve 72 of the rear-axle brake circuit II can remain open or be closed in this situation.

Simply activating the left front wheel brake 11 of a vehicle can be a suitable measure, e.g. when travelling through a right-hand bend, to counteract a tendency of the vehicle to oversteer. This oversteering can occur, in particular, in a vehicle with rear-axle drive when the bend is driven through with a high degree of traction. Consequently, as a result of the relatively high drive slip, the reserves of lateral guiding forces of the rear wheels is, so to speak, used up and a correspondingly high lateral slip occurs. In such a situation, the lateral slip at the front wheels can be increased by increasing wheel slip, in particular at the left-hand front wheel, which is particularly highly stressed by the dynamic wheel load displacement, so that the vehicle drifts somewhat but no longer has a tendency to skid.

If, for the purpose of achieving such an adjustment of side slip at the front wheels, both front wheel brakes 11, 12 should be braked with different forces, this is readily achievable by actuating the inlet valves 31, 32 of the front wheel brakes in a correspondingly differently pulsed way.

Changes in brake pressure in phase opposition, i.e. an increase in brake pressure in one front wheel brake and a decrease in brake pressure in the other front wheel brake, are also possible by opening the outlet valve of that wheel brake at which the brake pressure is to be decreased, discharging brake fluid from the wheel brake and pumping it back into the main brake line 38 by the recirculation pump 52. If, in this situation, the pressure in the main brake line 38 is too high, the pressure-limiting valve 72 of the change-over valve 69 opens so that brake fluid can flow off therethrough to the auxiliary cylinder 73. Corresponding brake pressure adjustments can also be controlled in an analogous way at the rear wheel brakes and are also used there for traction control.

Although the recirculation pumps 52, 54 of both brake circuits I, II are activated in the event of the traction control system or the dynamic movement control system responding at the rear wheels in the illustrated embodiment, it is not absolutely necessary for the inlet valves 31, 32 and the change-over valve 72 of the front-axle brake circuit I to switch over into their blocking positions because the recirculation pump 52 of the front-axle brake circuit I requires brake fluid to be supplied at a minimum pressure level for the feeding mode. Inasmuch as simultaneous switching over of the change-over valves 69, 71 of both brake circuits I and II is not disruptive, however, these two change-over valves 69, 71 can, as an alternative to their illustrated configuration as solenoid valves, also be constructed as pressure-controlled valves which can be actuated by the output pressure of the auxiliary cylinder 73. With this alternative configuration, the change-over valves 69, 71 always have to be actuated, by actuating the activation control valve 98, if a dynamic movement control is to be utilized on one of the two brake circuits or the traction control system function is to be utilized at the rear-axle brake circuit. The precharging control valves 66, 67 can also be analogously constructed as pressure-controlled valves.

The actuation signals which are required for the specific types of control, i.e. anti-lock brake control, traction control and dynamic movement control, for the brake-pressure control valves, the recirculation pumps, for their control of the change-over valves and of the precharging control valve, of the supply control valve and of the actuation control valve of the brake-pressure control device 60 are generated by the electronic control unit 28 from processing of information input signals according to known plausibility criteria.

The information input signals are output by sensors which, for the sake of simplicity, are not illustrated. Some examples of sensors are wheel speed sensors which are individually assigned to the vehicle wheels; a pressure sensor which generates an electrical signal which is characteristic of the output pressure of the auxiliary cylinder 73; a steering angle sensor and/or a yawing sensor and/or a longitudinal and a lateral acceleration sensor whose output signals are either a direct measure of the longitudinal and lateral forces acting on the vehicle or in combination with the output signals of other sensors, in particular of the wheel speed sensors and computational processing of the same permit these forces to be calculated.

An explanation of the detail of the foregoing circuitry of this electronic control unit 28 is not considered to be necessary since, given knowledge of its purpose, the technical implementation of such a control unit is readily possible for a person skilled in the art who is familiar with electronic circuit technology and provided with state-of-the-art electronic equipment.

In order to explain a second embodiment of a brake-pressure control device 65' which is functionally analogous with the brake-pressure control device 60 according to FIG. 1, reference will now be made to the relevant features of FIG. 2. Explanation of the second embodiment is also made to the description relating to FIG. 1, to the extent that the same reference symbols are used in FIG. 2 as in the description of the embodiment according to FIG. 1. The description of the brake-pressure control device 60' of FIG. 2 is therefore limited to those elements of the same which distinguish it from the brake-pressure control device 60 of FIG. 1.

In the brake-pressure control device 60', a hydraulic drive cylinder 91' is provided for the auxiliary cylinder 73 of the precharging pressure source 63. The drive cylinder 91' is supplied, for the purpose of activating the auxiliary cylinder 73, with the output pressure of a conventional hydraulic pressure source, which is already present on the vehicle and therefore is not separately illustrated, such as, for example, the permanently driven pressure supply pump of a hydraulic power steering system or of a hydraulic ride leveller device whose output pressure level is usually between &O bar and 120 bar.

The housing of the drive system 91' is formed by an extension section 104 of the cylinder housing 106 of the auxiliary cylinder 73 in whose central housing hole 107 both the piston 76 of the auxiliary cylinder 73 and the piston 94' of the drive cylinder 91' are arranged so as to be displaceable in a pressure-tight way. The piston 94' forms the axially movable boundary of the drive chamber 97' of the drive cylinder 91' which is closed off in a pressure-tight way by a terminating plate 108 which is fixed onto the end of the extension 104.

The piston 94' is supported on the piston 76 of the auxiliary cylinder 73 by an axial plunger 96' by whose length, measured along the central axis 109 of the cylinder housing 106, 104, the axial extent of an annular-cylindrical media-separating space 111 is determined. The media-separating space 111 is kept in a nonpressurized state, or at the atmospheric ambient temperature, by a venting hole 112 of the cylinder housing 106, 104. The drive piston 94' is also provided in its side facing away from the media-separating space 111 with a plunger-shaped axial stop projection 113 which, by resting on the terminating plate 108, determines the basic position of its pistons 94', 76 which corresponds to the non-activated state of the drive cylinder 91' and of the auxiliary cylinder 73. Both pistons 94' and 76 are forced into their basic position by the restoring spring 77 of the auxiliary cylinder 73.

The venting hole 112 of the media-separating space opens within an inner annular groove 114 of the cylinder housing 106, 104 whose auxiliary cylinder-side, radial groove cheek 116 is arranged, in relation to the illustrated basic position of the drive piston 94' of the drive cylinder 91' which corresponds to the non-activated state of the auxiliary cylinder 73, at an axial distance from the auxiliary cylinder-side annular end face 117 of the drive cylinder 91'. This axial distance is greater than the maximum axial stroke of the pistons 76, 94' of the auxiliary-cylinder and drive-piston arrangement 76, 94'. As a result, the drag areas for brake fluid, on one hand, and operating medium of the drive cylinder, on the other hand, are effectively separated. Thereby, mineral hydraulic oil, which is used as pressure medium and with which the drive cylinder 91' is operated, is as far as possible prevented from coming into contact with the pressure medium (brake fluid) of the brake circuit I, because the pressure media which are most favorable for each purpose are usually chemically not compatible with one another.

Activation-control of the drive cylinder 91' and of the auxiliary cylinder 73 of the precharging pressure source 63 of the brake-pressure control device 60' is provided by two solenoid valves 118, 119 which can be actuated individually by output signals of the electronic control unit 28 and which are each constructed as 2/2-way solenoid valves. One solenoid valve 118 is constructed as a valve which is open in the deactivated state and blocks in the excited state, and which in its basic position 0 connects the drive pressure space 97' of the drive cylinder 91' to the reservoir container of an auxiliary pressure source (not illustrated) and in its excited position I blocks off from the reservoir container.

The second solenoid valve 119 has a blocking basic position 0 and a through-flow position as excited position I in which the drive pressure space 97' of the drive cylinder 91' of the auxiliary cylinder 73 is connected to the pressure output of the auxiliary pressure source.

Figure 3:
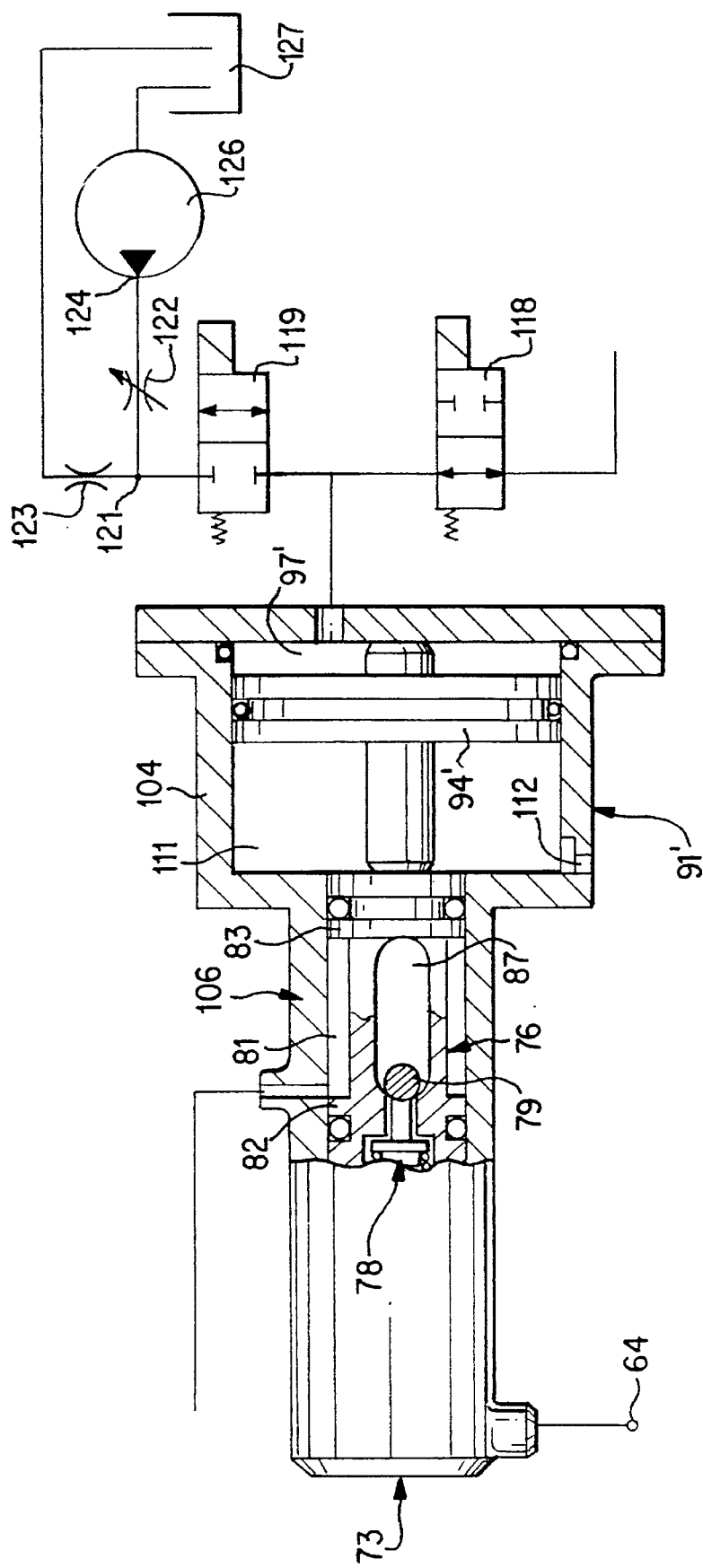
FIG. 3 is a partial cross-sectional side view of a precharging pressure source which can be used in the brake-pressure control of FIG. 2.

If, as illustrated in FIG. 3, the extension 104 of the auxiliary cylinder housing 106 is constructed as a housing step which is larger in diameter and in which a drive piston 94' of correspondingly larger diameter is guided so as to be displaceable in a pressure-tight way, an auxiliary pressure source with a correspondingly lower output pressure level can be utilized to apply pressure to the drive chamber 97'. A pneumatic pressure supply pump which supplies an operating pressure of only approximately 5–10 bar is then suitable, for example, as the pressure source.

In order to apply pressure to the drive chamber 97' of the drive cylinder 91' of the auxiliary cylinder 73, back pressure can also be utilized. This back pressure can be tapped off during the operation of the hydraulic pump 126 at a center tap 121 of two throttles 122, 123 which are arranged hydraulically in series between the pressure output 124 of the hydraulic pump 126 which can be operated at a relatively high output pressure level and the pressure-medium reservoir container 127 of the hydraulic pump 126. The back pressure is applied to the drive chamber 97' via the inlet solenoid valve 119. Here, it is advantageous if at least one of the two throttles 122, 123 is constructed as an adjustable throttle so that the pressure which is provided at the center tap 121 in the feed mode of the pump 126 can be adjusted and thus adapted to the demand in terms of actuation force required by the auxiliary cylinder 73.

It is also to be noted that, with respect to FIG. 3, reference symbols which are identical with those relating to the description of parts illustrated in FIGS. 1 and 2, including their constructional and functional elements, need not be again described for understanding the operation of the precharging pressure source in FIG. 3.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A brake-pressure control device for a vehicle with hydraulic brake system having two brake circuits and equipped with an anti-lock brake system (ABS) which operates according to a recirculation principle, and with a device for dynamic movement control (FDR) mode operating according to a principle of keeping longitudinal slip and lateral slip of vehicle wheels within limits which are compatible overall with dynamic stability of the vehicle by electronically controlled, automatic activation of at least one wheel brake, comprising (a) a brake-pressure control device including a brake circuit distribution with a front-axle brake circuit and a rear-axle brake circuit, and a static main cylinder with pressure outputs individually assigned to the brake circuits;

(b) ABS recirculation pumps configured to operate as at least one pressure source from which the at least one wheel brake utilized for the dynamic movement control is suppliable with brake pressure, with a recirculation pump assigned to the brake circuit of the front axle requiring minimum input pressure level for feed mode;

(c) a low pressure input of the recirculation pump of the front-axle brake circuit configured for connection by a precharging control valve to an output pressure space of a precharging cylinder configured as a single-circuit main cylinder which has a piston forming an axially movable boundary of the drive pressure space and being arranged to be displaceable by applying pressure to a drive pressure space to increase pressure in the output pressure space, and has axially spaced flanges between which an overrun space is defined and kept in constant communication with a front-axle pressure output of the main cylinder, the piston being provided with a valve arranged to be activated mechanically to function as a non-return valve which blocks a through-flow channel of the piston connecting the overrun space to the output pressure space when pressure in the output pressure space of the precharging cylinder is larger than a pressure in the overrun space and opens the through-flow channel when the output pressure of the main cylinder is larger than a pressure in the output pressure space of the precharging cylinder;

(d) change-over valves individually assigned to each of the brake circuits and operatively connected between the main cylinder pressure outputs and main brake lines of the brake circuits, the change-over valves having an open, basic position assigned to a normal braking mode and a blocking, switched position assigned to the dynamic movement control (FDR) mode;

(e) an inflow control valve operatively arranged to have a basic, blocking position in which a supply path from the rear-axle pressure output of the main cylinder to the low pressure side of the recirculation pump of the brake circuit of the rear axle is blocked and a switched position assigned to the dynamic movement control (FDR) mode in which a through-flow position opens the supply path; and (f) low pressure inputs of the two recirculation pumps operatively connected to a return line of the respective brake circuit via a non-return valve arranged to be acted on in an opening direction by relatively higher pressure in the return line than at the respective low pressure input and is otherwise in a blocking state; wherein (g) the recirculation pump of the rear-axle brake circuit is configured as a self-priming pump; and (h) the precharging cylinder is configured selectively to increase pressure in the output pressure space by one of (i) valve-controlled application to a drive pressure space of the precharging cylinder of output pressure of a built-in vehicle hydraulic pressure source, wherein the output pressure is generated by one of a hydraulic power steering system and a permanently driven hydraulic ride leveller pump and (ii) valve-controlled venting of a drive chamber constituting the drive pressure space previously connected to a built-in vacuum source of a pneumatic driving cylinder and output pressure of a built-in, pneumatic pressure source to the pneumatic driving cylinder.

2. The brake-pressure control device according to claim 1, wherein a piston of the drive cylinder is operatively arranged to be displaceable in a pressure-tight way in one of an axial extension of a housing of the precharging cylinder and in a separate housing component fitted to the housing of the precharging cylinder in a coaxial arrangement with the piston of the precharging cylinder, the piston of the drive cylinder engaging on the piston of the precharging cylinder via a central axial plunger.

3. The brake-pressure control device according to claim 1, wherein a media-separating space is arranged between the overrun space of the precharging cylinder and the drive chamber of the drive cylinder.

4. The brake-pressure control device according to claim 3, wherein a piston of the drive cylinder is operatively arranged to be displaceable in a pressure-tight way in one of an axial extension of a housing of the precharging cylinder and in a separate housing component fitted to the housing of the precharging cylinder in a coaxial arrangement with the piston of the precharging cylinder, the piston of the drive cylinder engaging on the piston of the precharging cylinder via a central axial plunger.

5. The brake-pressure control device according to claim 3, wherein the media-separating space is one of ventable and connected to a vehicle engine intake manifold.

6. The brake-pressure control device according to claim 5, wherein the drive cylinder is a hydraulic cylinder suppliable with output pressure of a built-in hydraulic pump, and drag areas of the precharging cylinder piston and of the drive piston are offset with respect to one another by at least one radial housing shoulder configured and arranged to be travelled over by only one of the precharging cylinder piston and the drive piston, and the drag area of the other of the pistons ending at a distance from the radial shoulder.

7. The brake-pressure control device according to claim 5, wherein drag areas of the precharging cylinder piston and of the drive piston are offset from one another by an annular groove of the cylinder housing.

8. The brake-pressure control device according to claim 6, wherein a housing channel opens into the media-separating space to vent the media-separating space between the radial housing shoulder and one of an end adjacent thereto of the drag area of the one piston and within the annular groove providing the offset between the drag areas of the two pistons.

9. The brake-pressure control device according to claim 7, wherein a housing channel opens into the media-separating space to vent the media-separating space between a radial housing shoulder and one of an end adjacent thereto of the drag area of the one piston and within the annular groove providing the offset between the drag areas of the pistons.

10. The brake-pressure control device according to claim 6, wherein the drive piston and the precharging cylinder piston are separate components.

11. The brake-pressure control device according to claim 10, wherein drag areas of the precharging cylinder piston and of the drive piston are offset from one another by an annular groove of a precharging cylinder housing.

12. The brake-pressure control device according to claim 6, wherein the drive pressure arranged to be applicable to the drive chamber of the drive cylinder is tapped off as back pressure at a center tap of a throttle section comprising at least two series-connected throttles between the output of a hydraulic pump and a reservoir container.

13. The brake-pressure control device according to claim 12, wherein drag areas of the precharging cylinder piston and of the drive piston are offset from one another by an annular groove of a precharging cylinder housing.

14. The brake-pressure control device according to claim 12, wherein at least one of the two throttles is adjustable.

15. The brake-pressure control device according to claim 6, wherein the change-over valves are pressure-controlled with control chambers configured to be connected to a pressure port of the precharging cylinder.

16. The brake-pressure control device according to claim 15, wherein a housing channel opens into the media-separating space to vent the media-separating space between the radial housing shoulder and one of an end adjacent thereto of the drag area of the one piston and within the annular groove providing the offset between the drag areas of the pistons.

17. The brake-pressure control device according to claim 16, wherein the drive piston and the precharging cylinder piston are separate components.

18. The brake-pressure control device according to claim 17, wherein the drive pressure arranged to be applicable to the drive chamber of the drive cylinder is tapped off as back pressure at a center tap of a throttle section between the output end of a hydraulic pump and a reservoir container.

* * * * *